US012080916B2

United States Patent
Morisawa et al.

(10) Patent No.: US 12,080,916 B2
(45) Date of Patent: Sep. 3, 2024

(54) CYLINDRICAL BATTERY

(71) Applicants: SANYO Electric Co., Ltd., Daito (JP); Panasonic Corporation, Kadoma (JP)

(72) Inventors: Naoya Morisawa, Hyogo (JP); Shimpei Yamagami, Osaka (JP); Takamitsu Tashita, Tokushima (JP); Fumikazu Mizukoshi, Osaka (JP)

(73) Assignees: PANASONIC ENERGY CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 625 days.

(21) Appl. No.: 17/426,001

(22) PCT Filed: Feb. 5, 2020

(86) PCT No.: PCT/JP2020/004405
§ 371 (c)(1),
(2) Date: Jul. 28, 2021

(87) PCT Pub. No.: WO2020/162504
PCT Pub. Date: Aug. 13, 2020

(65) Prior Publication Data
US 2022/0166115 A1    May 26, 2022

(30) Foreign Application Priority Data
Feb. 8, 2019  (JP) ................. 2019-021656

(51) Int. Cl.
*H01M 50/528*    (2021.01)
*H01M 4/02*    (2006.01)
(Continued)

(52) U.S. Cl.
CPC ......... *H01M 50/528* (2021.01); *H01M 4/625* (2013.01); *H01M 10/0587* (2013.01); *H01M 50/107* (2021.01); *H01M 2004/027* (2013.01)

(58) Field of Classification Search
CPC ............... H01M 50/528; H01M 4/625; H01M 10/0587; H01M 50/107; H01M 2004/027;
(Continued)

(56) References Cited

U.S. PATENT DOCUMENTS

| 2013/0309578 A1 | 11/2013 | Umeno et al. |
| 2019/0115585 A1 | 4/2019 | Tsujiko et al. |
| 2020/0044276 A1 | 2/2020 | Sakai et al. |

FOREIGN PATENT DOCUMENTS

| CN | 105845935 A | 8/2016 |
| JP | 2011-60465 A | 3/2011 |

(Continued)

OTHER PUBLICATIONS

The Extended European Search Report dated Mar. 3, 2022, issued in counterpart EP Application No. 20752637.7. (7 pages).
International Search Report dated Apr. 14, 2020, issued in counterpart application No. PCT/JP2020/004405 (2 pages).

*Primary Examiner* — Helen Oi K Conley
(74) *Attorney, Agent, or Firm* — WHDA, LLP

(57) ABSTRACT

A cylindrical battery, as one example according to an embodiment of the present disclosure, is provided with: an electrode body formed by spirally winding a positive electrode and a negative electrode with a separator interposed therebetween; and a bottomed cylindrical exterior can for accommodating the electrode body. The negative electrode has a negative-electrode core body and a negative-electrode mixture layer provided on a surface of the negative-electrode core body. An exposed area in which the surface of the negative-electrode core body is exposed is formed on an outer circumferential surface of the electrode body, and the exposed area is in contact with the inner surface of the exterior can. The negative-electrode mixture layer contains, (Continued)

as a negative-electrode active material, graphite particles having an internal porosity of 5% or less and a fracture strength of 25-55 MPa.

2 Claims, 2 Drawing Sheets

(51) Int. Cl.
*H01M 4/62* (2006.01)
*H01M 10/0587* (2010.01)
*H01M 50/107* (2021.01)

(58) Field of Classification Search
CPC .... H01M 4/0471; H01M 4/587; H01M 4/621; H01M 10/0431; H01M 50/545; H01M 4/133; H01M 10/0422; H01M 10/0525; Y02P 70/50; Y02E 60/10
See application file for complete search history.

(56) References Cited

FOREIGN PATENT DOCUMENTS

| | | |
|---|---|---|
| JP | 2013-134938 A | 7/2013 |
| JP | 2013-254561 A | 12/2013 |
| JP | 2014-102877 A | 6/2014 |
| JP | 2019-75199 A | 5/2019 |
| WO | 2012/077653 A1 | 6/2012 |
| WO | 2018/142928 A1 | 8/2018 |

CYLINDRICAL BATTERY

TECHNICAL FIELD

The present disclosure relates to a cylindrical battery.

BACKGROUND ART

There have widely known cylindrical batteries which comprise an electrode assembly having a positive electrode and a negative electrode wound into a spiral shape with a separator intervening therebetween, and a bottomed cylindrical exterior can housing the electrode assembly. For example, PATENT LITERATURE 1 discloses a cylindrical battery having a structure in which an exposed part from which a surface of the negative electrode core is exposed is formed on the outer peripheral surface of the winding-type electrode assembly and the exposed part is brought into contact with an inner surface of the metal-made exterior can which is a negative electrode external terminal.

CITATION LIST

Patent Literature

PATENT LITERATURE 1: Japanese Unexamined Patent Application Publication No. 2013-254561

SUMMARY

Technical Problem

However, there is a case where the cylindrical battery in PATENT LITERATURE 1 causes a contact state between the outer peripheral surface of the electrode assembly and the inner surface of the exterior can to be unstable, which results in a large variation in internal resistance value.

Solution to Problem

A cylindrical battery which is an aspect of the present disclosure comprises: an electrode assembly having a positive electrode and a negative electrode wound into a spiral shape with a separator intervening therebetween; and a bottomed cylindrical exterior can housing the electrode assembly, characterized in that the negative electrode has a negative electrode core, and a negative electrode mixture layer provided on a surface of the negative electrode core, an exposed part from which a surface of the negative electrode core is exposed is formed on an outer peripheral surface of the electrode assembly, and the exposed part is in contact with an inner surface of the exterior can, and the negative electrode mixture layer includes, as a negative electrode active material, graphite particles having 5% or less of internal porosity and 25 MPa to 55 MPa of breaking strength.

Advantageous Effects of Invention

According to the cylindrical battery which is an aspect of the present disclosure, the contact state between the outer peripheral surface of the electrode assembly and the inner surface of the exterior can may be maintained to be stable and the variation in internal resistance value may be reduced.

DESCRIPTION OF EMBODIMENTS

As mentioned above, it is an important problem to maintain the contact state between the outer peripheral surface of the electrode assembly and the inner surface of the exterior can to be stable in the cylindrical battery having the structure which brings the outer peripheral surface of the winding-type electrode assembly in which the exposed part on the surface of the negative electrode core is formed into contact with the inner surface of the exterior can. The inventors have intensively investigated in order to solve this problem, and consequently, have found that the contact state between the outer peripheral surface of the electrode assembly and the inner surface of the exterior can is stabilized and the variation in internal resistance is reduced by using, as the negative electrode active material, the graphite particles having 5% or less of internal porosity and 25 MPa to 55 MPa of breaking strength.

As to the cylindrical battery according to the present disclosure, it is probable that, by controlling the breaking strength of the graphite particles to be 25 MPa to 55 MPa, this enlarges repulsive force caused by compression of the mixture layer in production of the negative electrode, by controlling the internal porosity of the graphite particles to be 5% or less, this allows the repulsive force caused by the compression not to be absorbed by the pores, and the negative electrode expands to be large after the electrode assembly is inserted into the exterior can. It is inferred that such a mechanism stabilizes the contact state between the outer peripheral surface of the electrode assembly and the inner surface of the exterior can.

Hereafter, an example of embodiments of the present disclosure will be described in detail. The drawings referred to for the description of embodiments are schematically presented, and therefore, the dimensional proportions and the like of the constituents should be construed properly in consideration of the following description.

Figure 1:
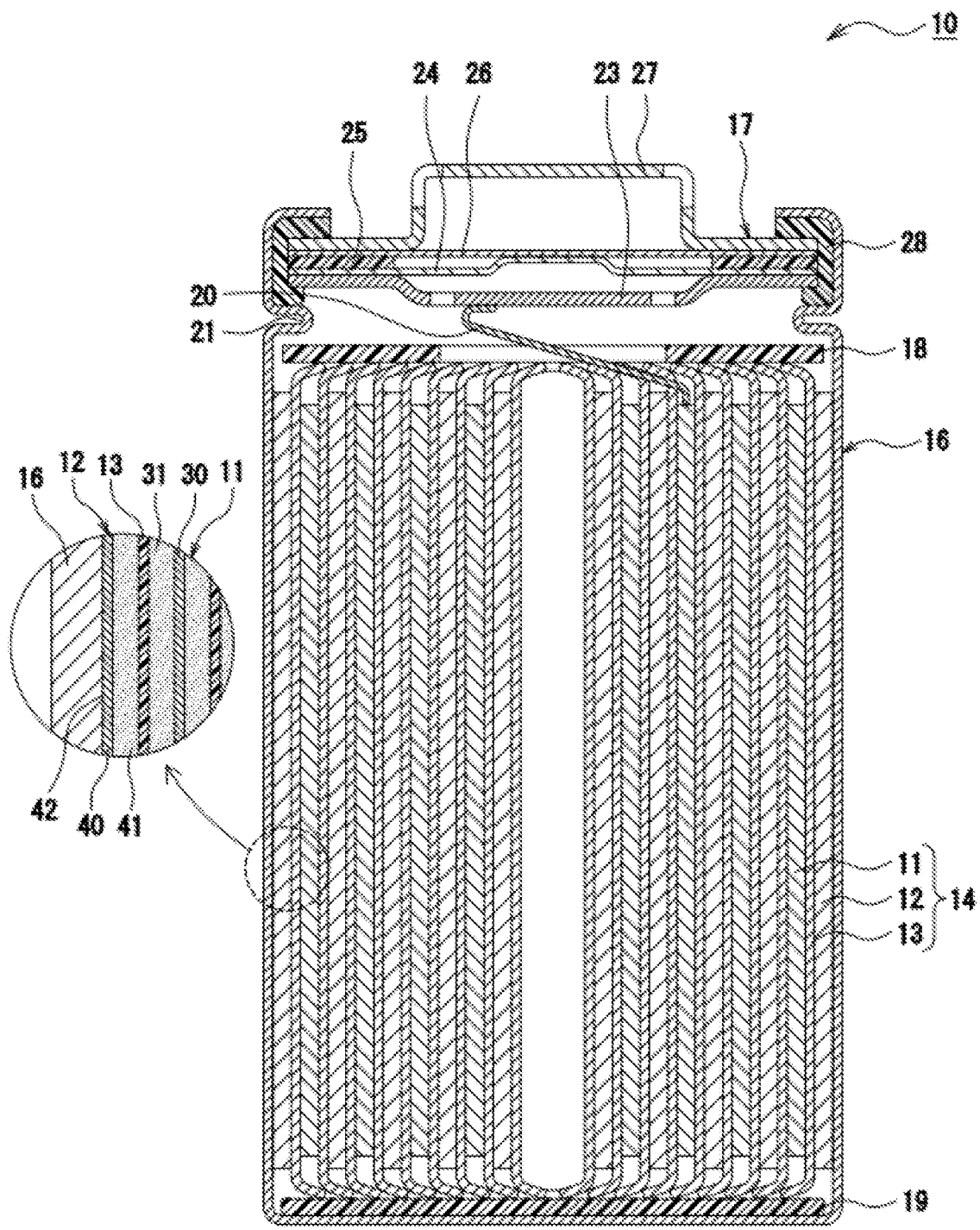
FIG. 1 is a sectional view of a cylindrical battery which is an example of embodiments.

FIG. 1 is a sectional view of a cylindrical battery 10 which is an example of embodiments. As exemplarily shown in FIG. 1, the cylindrical battery 10 comprises an electrode assembly 14, an electrolyte (not shown) and an exterior can 16 housing the electrode assembly 14 and the electrolyte. The electrode assembly 14 has a positive electrode 11, a negative electrode 12 and separators 13 and has a winding structure in which the positive electrode 11 and the negative electrode 12 are wound into a spiral shape with the separators 13 intervening therebetween. The exterior can 16 is a bottomed cylindrical metal-made container which opens on one side in its axis direction, and the opening of the exterior can 16 is closed by the sealing assembly 17. Hereafter, the sealing assembly 17 side of the cylindrical battery 10 is regarded as being upward and the bottom part side of the exterior can 16 is regarded as being downward for convenience of description.

For the electrolyte, a non-aqueous electrolyte is used, for example. The non-aqueous electrolyte includes a non-aqueous solvent and an electrolyte salt dissolved in the non-aqueous solvent. For the non-aqueous solvent, there may be used, for example, esters, ethers, nitriles, amides, mixed solvents of two or more of these, and the like. The non-aqueous solvent may contain a halogen-substituted substance having halogen atom(s) such as fluorine substituted for at least part of hydrogens in these solvents. Notably, the non-aqueous electrolyte is not limited to a liquid electrolyte but may be a solid electrolyte. For the electrolyte salt, there is used, for example, a lithium salt such as $LiPF_6$. The kind of the electrolyte is not specially limited but it may also be an aqueous electrolyte.

All of the positive electrode 11, the negative electrode 12 and the separators 13 constituting the electrode assembly 14 are belt-shaped long components, are wound into a spiral shape, and thereby, alternately laminated in the radial direction of the electrode assembly 14. The positive electrode 11 has a positive electrode core 30 and positive electrode mixture layers 31 provided on surfaces of the positive electrode core 30. Likewise, the negative electrode 12 has a negative electrode core 40 and negative electrode mixture layers 41 formed on the negative electrode core 40. The cylindrical battery 10 comprises insulating plates 18 and 19 arranged on and below on the electrode assembly 14, respectively.

On the outer peripheral surface of the electrode assembly 14, the negative electrode 12 is arranged, and there is formed an exposed part 42 from which a surface of the negative electrode core 40 is exposed. While the exposed part 42 may be formed on a part of the outer peripheral surface of the electrode assembly 14, it is preferably formed on the whole area of the outer peripheral surface thereof. The exposed part 42 may be formed on only one surface (outer surface), of the negative electrode core 40, that is oriented to the outside of the electrode assembly 14, or may be formed on both surfaces of the negative electrode core 40. The exposed part 42 is formed, for example, in a range by a length of about one to two circumferences of the electrode assembly 14 from one end, of the negative electrode core 40 in the longitudinal direction, that is positioned on the outer peripheral surface of the electrode assembly 14.

In the cylindrical battery 10, the exposed part 42 of the negative electrode 12 is brought into contact with the inner surface of the exterior can 16, so the negative electrode 12 and the exterior can 16 are electrically connected to each other. In the present embodiment, the sealing assembly 17 is a positive electrode external terminal, and the exterior can 16 is a negative electrode external terminal. A positive electrode lead 20 attached to the positive electrode 11 extends to the sealing assembly 17 side through a through hole of the insulating plate 18 and is welded onto a lower surface of an internal terminal plate 23 which is a bottom plate of the sealing assembly 17. While a negative electrode lead does not have to be connected to the negative electrode 12, there is preferably attached a negative electrode lead connected to the inner surface of the bottom part of the exterior can 16 by welding or the like, to an end, of the negative electrode 12 in the longitudinal direction, that is positioned on the winding core side of the electrode assembly 14. Notably, an exposed part on the surface of the electrode core is formed in the portion to which the electrode lead is connected.

A gasket 28 is provided between the exterior can 16 and the sealing assembly 17 and the sealing property of the interior of the battery is secured. There is formed, in the exterior can 16, a grooved part 21 which has a part of its lateral surface part caused to project to the inside and supports the sealing assembly 17. The grooved part 21 is preferably formed into an annular shape along the circumferential direction of the exterior can 16 and supports the sealing assembly 17 on its upper surface. The sealing assembly 17 is fixed to an upper part of the exterior can 16 by the grooved part 21 and the opening end part of the exterior can 16 which is crimped onto the sealing assembly 17.

The sealing assembly 17 has a structure in which the internal terminal plate 23, a lower vent member 24, an insulating member 25, an upper vent member 26 and a cap 27 are laminated sequentially from the electrode assembly 14 side. The members constituting the sealing assembly 17 have disc shapes or ring shapes, for example, and the members except the insulating member 25 are electrically connected to one another. The lower vent member 24 and the upper vent member 26 are connected to each other at their center parts, and the insulating member 25 interposes between their peripheral edges. When the internal pressure of the battery rises due to abnormal heat generation, the lower vent member 24 deforms so as to push the upper vent member 26 upward to the cap 27 side to fracture, and a current path between the lower vent member 24 and the upper vent member 26 is disconnected. When the internal pressure further rises, the upper vent member 26 fractures, and gas is discharged from a vent hole of the cap 27.

Hereafter, there will be described in detail the positive electrode 11, the negative electrode 12 and the separators 13 constituting the electrode assembly 14, in particular, an active material of the negative electrode 12.

[Positive Electrode]

As mentioned above, the positive electrode 11 has the positive electrode core 30 and the positive electrode mixture layer(s) 31 provided on the surface(s) of the positive electrode core 30. For the positive electrode core 30, there can be used foil of a metal, such as aluminum, stable in the potential range of the positive electrode 11, a film having the metal disposed on its surface layer, and the like. The positive electrode mixture layer 31 includes a positive electrode active material, a conductive agent, and a binder, and is preferably provided on each of both surfaces of the positive electrode core 30 except for the portion connected to the positive electrode lead 20. The positive electrode 11 can be produced, for example, by applying positive electrode mixture slurry including the positive electrode active material, the conductive agent, the binder, and the like on the surfaces of the positive electrode core 30, drying the coating film, and after that, compressing it to form the positive electrode mixture layers 31 on both surfaces of the positive electrode core 30.

The positive electrode active material is composed of a lithium-containing transition metal composite oxide as its main component. Examples of metal element(s) contained in the lithium-containing transition metal composite oxide include Ni, Co, Mn, Al, B, Mg, Ti, V, Cr, Fe, Cu, Zn, Ga, Sr, Zr, Nb, In, Sn, Ta, and W. A preferred example of the lithium-containing transition metal composite oxide is a composite oxide containing at least one of the group consisting of Ni, Co, and Mn. Its specific examples include a lithium-containing transition metal composite oxide containing Ni, Co, and Mn, and a lithium-containing transition metal composite oxide containing Ni, Co, and Al.

Examples of the conductive agent included in the positive electrode mixture layer 31 can include carbon materials such as carbon black, acetylene black, Ketjen black, and graphite. Examples of the binder included in the positive electrode mixture layer 31 can include fluorine resins such as polytetrafluoroethylene (PTFE) and polyvinylidene fluoride (PVdF), polyacrylonitrile (PAN), polyimide resins, acrylic resins, and polyolefin resins. There may be used, together with these resins, cellulose derivatives such as carboxymethylcellulose (CMC) or its salt, polyethylene oxide (PEO), and the like.

[Negative Electrode]

As mentioned above, the negative electrode 12 has the negative electrode core 40 and the negative electrode mixture layer(s) 41 provided on the surface(s) of the negative electrode core 40. Moreover, in the negative electrode 12, the exposed part 42 from which the surface of the negative electrode core 40 is exposed is formed on the portion corresponding to the outer peripheral surface of the electrode assembly 14. For the negative electrode core 40, there can be used foil of a metal, such as copper, stable in the potential range of the negative electrode 12, a film having the metal disposed on its surface layer, and the like. The negative electrode mixture layer 41 includes a negative electrode active material and a binder, and is preferably provided on each of both surfaces of the negative electrode core 40 except for the portion to which the negative electrode lead is connected and the exposed part 42, for example. The negative electrode 12 can be produced, for example, by applying negative electrode mixture slurry including the negative electrode active material, the binder, and the like on the surfaces of the negative electrode core 40, drying the coating film, and after that, compressing it to form the negative electrode mixture layers 41 on both surfaces of the negative electrode core 40.

The negative electrode mixture layer 41 includes, as the negative electrode active material, graphite particles having 5% or less of internal porosity and 25 MPa to 55 MPa of breaking strength (which is hereinafter occasionally called "graphite particles P"). Use of the graphite particles P stabilizes the contact state between the outer peripheral surface, of the electrode assembly 14, that the exposed part 42 is formed on and the inner surface of the exterior can 16 and reduces the variation in internal resistance of the battery. While the graphite particles P may be any of natural graphite and artificial graphite, they are preferably artificial graphite in consideration of easiness in adjusting the internal porosity and the breaking strength. For the negative electrode mixture layer 41, there may be used, together with them, graphite particles other than the graphite particles P, metals, such as Si, alloyed with lithium, alloys containing the metals, compounds containing the metals, and the like to such an extent that the object(s) of the present disclosure is(are) not impaired.

The negative electrode mixture layer 41 preferably includes 15 mass % or more of graphite particles P relative to the total mass of the negative electrode active material, and the content of the graphite particles P may be 100 mass %. Although even if the content of the graphite particles P is less than 15 mass %, there is obtained the effect of reducing the variation in internal resistance of the battery, they more significantly exhibit the effect by setting it to be 15 mass % or more. The negative electrode mixture layer 41 may include, as the negative electrode active material, the graphite particles P and other graphite particles. The other graphite particles have more than 5% and 20% or less of internal porosity and 5 MPa or more and less than 25 MPa of breaking strength, for example.

The median size of the graphite particles P based on volume (hereinafter set as "D50") is, for example, 5 μm to 30 μm, preferably 10 μm to 25 μm, still preferably 15 to 20 μm. D50 can be measured with water being as a dispersion medium using a laser diffraction-type particle size distribution measurement apparatus (for example, LA950, HORIBA). D50 means, in the particle size distribution based on volume, the particle size at 50% of accumulation of those having smaller particle sizes.

The graphite particles P have, in particle cross sections, pores (internal pores) that exist inside the particles, do not communicate with the particle surfaces and are closed, and pores (external pores) that communicate with the particle surfaces. The internal porosity of the graphite particles P is a two-dimensional value calculated from the ratio of the area of the internal pores relative to the total area of the particle cross sections. The internal porosity of the graphite particles P may be substantially 0%. The internal porosity of graphite particles is calculated according to the following procedure.

[Measurement Method of Internal Porosity of Graphite Particles]

(1) A cross section of the negative electrode mixture layer is exposed. Examples of the method for exposing the cross section include a method in which a part of the negative electrode is cut out, and by an ion milling apparatus (for example, IM4000PLUS, Hitachi High-Tech Corporation), is processed to expose the cross section of the negative electrode mixture layer.

(2) A backscattered electron image of the exposed cross section of the negative electrode mixture layer is captured using a scanning electron microscope (SEM). Its magnification in capturing the backscattered electron image is 3000 times to 5000 times.

(3) The sectional image of the negative electrode mixture layer is captured into a computer, which performs binarization processing thereon using image analysis software (for example, ImageJ, National Institutes of Health) to obtain a binarization processing image through conversion in which particle cross sections in the sectional image are made black and pores existing among the particle cross sections are made white.

(4) Graphite particles are selected from the binarization processing image to calculate the area of the particle cross sections, and the area of the internal pores existing among the particle cross sections.

Herein, the area of the particle cross sections designates the area of regions enclosed by the outer peripheries of the graphite particles, that is, the whole area of the sectional portions of the graphite particles. Moreover, as to pores having 3 μm or less of width among the pores existing among the particle cross sections, since there can be a case where it is difficult to determine whether they are internal pores or external pores in consideration of the image analysis, the pores having 3 μm or less of width may be regarded as internal pores. The average value of those of ten graphite particles is set to the internal porosity of the graphite particles.

[Measurement Method of Breaking Strength of Graphite Particles]

For measuring the breaking strength of graphite particles, a microcompression testing machine (MCT-W201, Shimadzu Corporation) is used. A measurement procedure is as follows.

(1) Graphite particles are scattered on the lower compression plate (SKS flat plate) of the measurement apparatus.

(2) There is selected a particle having a size close to D50 by an optical microscope.

(3) There is used a diamond-made flat indenter having 50 μm of diameter as the upper pressure applicator, and the one particle is solely put between this upper pressure applicator and the lower compression plate.

(4) The upper pressure applicator is slowly lowered, and after the time point when it comes into contact with the graphite particle (when the lowering speed changes), load is applied thereto at a constant acceleration.

(5) Relation between the load and the amount of deformation of the graphite particle is measured, there is set the point where the amount of deformation of the particle drastically changes (inflection point on the profile of the load versus the amount of deformation) to the breaking point, and from the load and the particle size at that point, the breaking strength is calculated based on the following expression. The average value of those of five graphite particles is set to the breaking strength.

$St = 2.8 P/\pi d^2$

St: Breaking strength [MPa]
P: Load [N]
d: Particle size [mm]

The graphite particles P are produced, for example, by crushing coke (precursor) which is a main raw material into a predetermined size, adding a binder to the crushed material to allow it to aggregate, after that, firing it at 2600° C. or more of temperature to allow it to graphitize, and sieving it. For the binder, pitch is preferably used. A part of the pitch evaporates in the firing step, and a part of the rest remains and graphitizes. The breaking strength of the particles can be adjusted, for example, by the amount of the remaining pitch, and the more the amount of the remaining pitch is, the higher the breaking strength tends to be. Moreover, the internal porosity can be adjusted to be 5% or less by the particle size of the precursor after crushing, the particle size of the precursor in the state of its aggregation, and the like.

Meanwhile, graphite particles having an internal porosity exceeding 5% can be produced by crushing coke (precursor) which is a main raw material into a predetermined size, adding a binder to the crushed material to allow it to aggregate, after that, further pressure molding it into a block shape, and firing it in this state at 2600° C. or more of temperature to allow it to graphitize. Also in this case, the breaking strength of the particles can be adjusted by the amount of the pitch. Moreover, the internal porosity of the particles can be adjusted by the amount of the pitch, and the molding pressure in molding the precursor into a block shape. In general, the more the amount of the pitch is and the smaller the molding pressure is, the higher the internal porosity is.

For the binder included in the negative electrode mixture layer 41, while there can also be used, similarly to the case of the positive electrode 20, fluorine resins, PAN, polyimide resins, acrylic resins, polyolefin resins, and the like, styrene-butadiene rubber (SBR) is preferably used. Moreover, the negative electrode mixture layer 41 preferably further includes CMC or its salt, polyacrylic acid (PAA) or its salt, polyvinyl alcohol (PVA), and the like. Among those, CMC or its salt, and PAA or its salt are preferably used together with SBR.

[Separator]

For the separators 13, there are used porous sheets having ion permeability and insulation properties. Specific examples of the porous sheets include microporous thin films, woven fabric, nonwoven fabric, and the like. The material of the separators 13 is preferably an olefin resin such as polyethylene and polypropylene, cellulose, or the like. The separators 13 each may have any of a single layer structure and a stacked structure. A heat resistant layer or the like may be formed on the surface of each separator 13.

EXAMPLES

While the present disclosure will be hereafter further described with examples, the present disclosure is not limited to these examples.

[Production of Negative Electrode Active Material]

There was used, as a graphite raw material, coke which had been crushed until D50 became 8 Pitch was added to the crushed coke, which was allowed to aggregate until D50 became 15 µm. The aggregate material was fired at 2600° C. to 3000° C. of temperature to be allowed to graphitize. In this stage, the amounts of evaporation of the pitch were adjusted such that the breaking strengths of particles became 10 MPa, 15 MPa, 30 MPa, 50 MPa, 55 MPa, and 60 MPa, respectively. After that, they were classified using sieves with 250 mesh to obtain graphite particles A, B, C, D, E, and F having 17 of D50. When the internal porosities of the graphite particles were measured by the aforementioned method, they were 5%. The internal porosities and the breaking strengths of the graphite particles A to F are as follows.

Graphite particles A: 5% of internal porosity, 10 MPa of breaking strength
Graphite particles B: 5% of internal porosity, 15 MPa of breaking strength
Graphite particles C: 5% of internal porosity, 30 MPa of breaking strength
Graphite particles D: 5% of internal porosity, 50 MPa of breaking strength
Graphite particles E: 5% of internal porosity, 55 MPa of breaking strength
Graphite particles F: 5% of internal porosity, 60 MPa of breaking strength There was used, as a graphite raw material, coke which had been crushed until D50 became 15 µm. Pitch was added to the crushed coke, which a predetermined pressure was applied to, producing block-shaped molded articles having 1.6 g/cc to 1.9 g/cc of densities. These molded articles were fired at 2400° C. to 3000° C. of temperature to be allowed to graphitize. In this stage, the amounts of evaporation of the pitch were adjusted such that the breaking strengths of particles became 10 MPa, 30 MPa, and 60 MPa. After that, the block-shaped molded articles having graphitized were crushed and classified using sieves with 250 mesh, thereby, to obtain graphite particles G, H, and I having 23 µm of D50. When the internal porosity of the graphite particles G was measured by the aforementioned method, it was 15%. The internal porosities and the breaking strengths of the graphite particles G to I are as follows.

Graphite particles G: 15% of internal porosity, 10 MPa of breaking strength
Graphite particles H: 15% of internal porosity, 30 MPa of breaking strength
Graphite particles I: 15% of internal porosity, 60 MPa of breaking strength Example 1

[Production of Positive Electrode]

As the positive electrode active material, there was used a lithium-containing transition metal composite oxide expressed by $LiNi_{0.88}Co_{0.09}Al_{0.03}O_2$. 100 parts by mass of the positive electrode active material, 1 part by mass of acetylene black, and 0.9 parts by mass of polyvinylidene fluoride were mixed to prepare positive electrode mixture slurry using N-methyl-2-pyrrolidone (NMP) as a dispersion medium. Next, the positive electrode mixture slurry was applied onto both surfaces of the positive electrode core composed of aluminum foil, and the coating film was dried through a thermal treatment at 100° C. to 150° C. of temperature. There was compressed the electrode core on which the coating film was formed using a roll press machine, and after that, was cut into a predetermined electrode size to produce the positive electrode having the positive electrode mixture layers formed on both surfaces of the positive electrode core. Notably, an exposed part from which a surface of the electrode core was exposed was provided at the center part of the positive electrode in the longitudinal direction, and the positive electrode lead was ultrasonic welded to the exposed part.

[Production of Negative Electrode]

As the negative electrode active material, the graphite particles C were used. 100 parts by mass of the negative electrode active material, 1 part by mass of carboxymethylcellulose (CMC), and 1.5 parts by mass of styrene-butadiene rubber (SBR) were mixed to prepare negative electrode mixture slurry using water as a dispersion medium. Next, the negative electrode mixture slurry was applied onto both surfaces of the negative electrode core composed of copper foil, and the coating film was dried. There was compressed the electrode core on which the coating film was formed using a roll press machine, and after that, was cut into a predetermined electrode size to produce the negative electrode having the negative electrode mixture layers formed on both surfaces of the negative electrode core. Notably, exposed parts from which surfaces of the electrode core were exposed were provided at both end parts of the negative electrode in the longitudinal direction, and the negative electrode lead was ultrasonic welded to one of the exposed parts.

[Preparation of Non-Aqueous Electrolytic Solution]

To a non-aqueous solvent in which ethylene carbonate (EC) and dimethyl carbonate (DMC) are mixed at a volume ratio of 1:3, vinylene carbonate (VC) was added at a concentration of 5 mass %, and $LiPF_6$ was dissolved at a concentration of 1.5 mol/L to prepare the non-aqueous electrolytic solution.

[Production of Battery]

By winding the aforementioned positive electrode and the aforementioned negative electrode into a spiral shape with the separators made of polyethylene intervening therebetween, a winding-type electrode assembly was produced. In this stage, the electrodes and the separators were wound such that the positive electrode mixture layer faced the negative electrode mixture layer with the separator intervening therebetween and such that the exposed part of the negative electrode (exposed part that the negative electrode lead did not exist on) constituted the outer peripheral surface of the electrode assembly. There was set the ratio of the diameter of the electrode assembly relative to the inner diameter of the exterior can to be 98% such that the electrode assembly could be inserted into the exterior can. The insulating plates were arranged on and below on the electrode assembly, respectively, the negative electrode lead was welded onto the inner surface of the bottom part of the exterior can, the positive electrode lead was welded to the internal terminal plate of the sealing assembly, and the electrode assembly was housed in the exterior can. After that, the non-aqueous electrolytic solution was injected into the exterior can in a reduced pressure manner, the opening of the exterior can was sealed with the sealing assembly with the gasket intervening therebetween, and thereby, a cylindrical battery was produced.

Example 2

A negative electrode and a cylindrical battery were produced similarly to Example 1 except that the graphite particles D were used as the negative electrode active material.

Example 3

A negative electrode and a cylindrical battery were produced similarly to Example 1 except that the graphite particles E were used as the negative electrode active material.

Example 4

A negative electrode and a cylindrical battery were produced similarly to Example 1 except that 30 parts by mass of the graphite particles C and 70 parts by mass of the graphite particles G were mixed and used as the negative electrode active material.

Example 5

A negative electrode and a cylindrical battery were produced similarly to Example 1 except that 15 parts by mass of the graphite particles C and 85 parts by mass of the graphite particles G were mixed and used as the negative electrode active material.

Comparative Example 1

A negative electrode and a cylindrical battery were produced similarly to Example 1 except that the graphite particles A were used as the negative electrode active material.

Comparative Example 2

A negative electrode and a cylindrical battery were produced similarly to Example 1 except that the graphite particles B were used as the negative electrode active material.

Comparative Example 3

A negative electrode and a cylindrical battery were produced similarly to Example 1 except that the graphite particles F were used as the negative electrode active material.

Comparative Example 4

A negative electrode and a cylindrical battery were produced similarly to Example 1 except that the graphite particles G were used as the negative electrode active material.

Comparative Example 5

A negative electrode and a cylindrical battery were produced similarly to Example 1 except that the graphite particles H were used as the negative electrode active material.

Comparative Example 6

A negative electrode and a cylindrical battery were produced similarly to Example 1 except that the graphite particles I were used as the negative electrode active material.

[Evaluation of Internal Resistance]

Using ten cylindrical batteries for each of the examples and the comparative examples, in an environment of 25° C. of temperature, they were charged at 0.5 It of constant current until their charging cut-off voltages became 4.2 V, and then, were discharged at 0.5 It of constant current until their discharging cut-off voltages became 3 V. Next, in an environment of 25° C. of temperature, there were measured AC resistances of the batteries at 1 kHz. Table 1 presents the results of the average and the variation (standard deviation) of these resistance values. Moreover, FIG. 2 shows relations between the internal porosity of the graphite particles, the breaking strength thereof, and the variation in internal resistance of the battery.

TABLE 1

| | Negative Electrode Active Material | Mass Proportion of Negative Electrode Active Material | Internal Resistance (mΩ) | |
|---|---|---|---|---|
| | | | Average Value | Standard Deviation |
| Example 1 | C | 100 | 16.7 | 0.24 |
| Example 2 | D | 100 | 16.4 | 0.61 |
| Example 3 | E | 100 | 16.5 | 0.64 |
| Example 4 | C/G | 30/70 | 17.8 | 0.80 |
| Example 5 | C/G | 15/85 | 18.2 | 0.88 |
| Comparative Example 1 | A | 100 | 18.8 | 1.51 |
| Comparative Example 2 | B | 100 | 17.3 | 1.21 |
| Comparative Example 3 | F | 100 | 18.8 | 1.45 |
| Comparative Example 4 | G | 100 | 20.3 | 1.43 |
| Comparative Example 5 | H | 100 | 20.4 | 1.71 |
| Comparative Example 6 | I | 100 | 19.2 | 1.93 |

Figure 2:
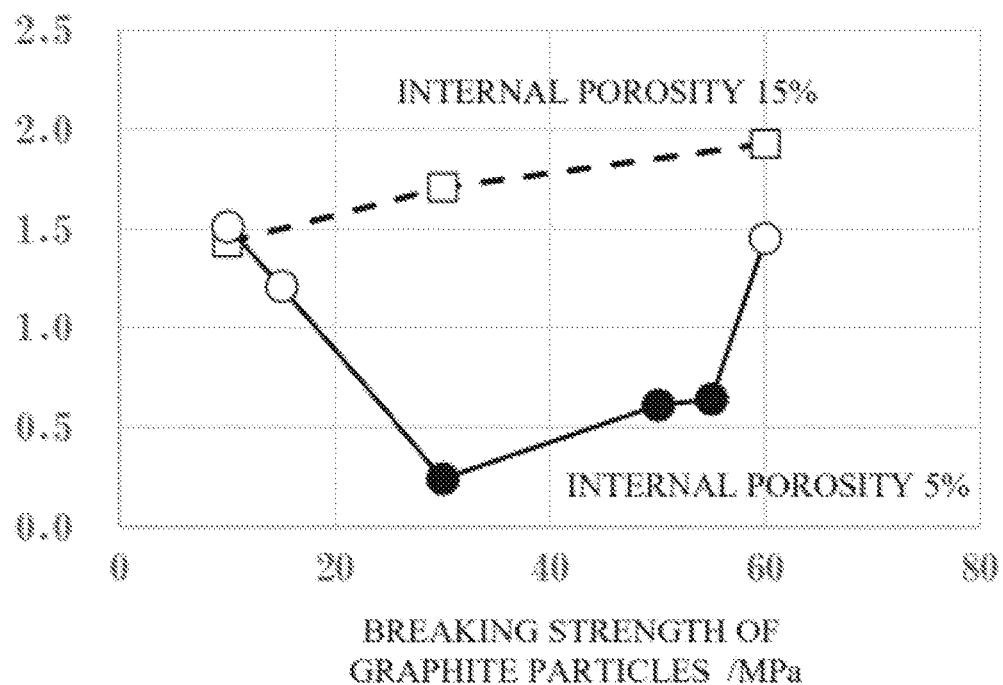
FIG. 2 is a diagram showing relations between the internal porosity of graphite particles, the breaking strength thereof, and a variation in internal resistance of the battery.

As shown in Table 1 and FIG. 2, all of the batteries of the examples exhibit smaller variations in internal resistance than the batteries of the comparative examples. In particular, for each of the batteries of Examples 1 to 3, the average value of the internal resistances is small, and the variation in internal resistance is also further reduced. It is probable that as to these results, the contact state between the outer peripheral surface of the electrode assembly and the inner surface of the exterior can is stabilized, since setting the breaking strength of the graphite particles to be 25 MPa to 55 MPa enlarges the repulsive force caused by the compression of the negative electrode mixture layer, and setting the internal porosity of the graphite particles to be 5% or less allows the repulsive force caused by the compression not to be absorbed by the pores and enlarges expansion of the negative electrode after the electrode assembly is inserted into the exterior can.

On the other hand, it is probable that as to the batteries of the comparative examples, since the mechanism as in the batteries of the examples does not work, the contact state between the outer peripheral surface of the electrode assembly and the inner surface of the exterior can is made unstable, and this enlarges the average value and the variation of the internal resistances.

REFERENCE SIGNS LIST 10 cylindrical battery, 11 positive electrode, 12 negative electrode, 13 separator, 14 electrode assembly, 16 exterior can, 17 sealing assembly, 18, 19 insulating plate, 20 positive electrode lead, 21 grooved part, 23 internal terminal plate, 24 lower vent member, 25 insulating member, 26 upper vent member, 27 cap, 28 gasket, 30 positive electrode core, 31 positive electrode mixture layer, 40 negative electrode core, 41 negative electrode mixture layer, 42 exposed part

The invention claimed is:

1. A cylindrical battery, comprising:
an electrode assembly having a positive electrode and a negative electrode wound into a spiral shape with a separator intervening therebetween; and
a bottomed cylindrical exterior can housing the electrode assembly, wherein
the negative electrode has a negative electrode core, and a negative electrode mixture layer provided on a surface of the negative electrode core,
an exposed part from which a surface of the negative electrode core is exposed is formed on an outer peripheral surface of the electrode assembly, and the exposed part is in contact with an inner surface of the exterior can, and
the negative electrode mixture layer includes, as a negative electrode active material, graphite particles having 5% or less of internal porosity and 25 MPa to 55 MPa of breaking strength.

2. The cylindrical battery according to claim 1, wherein the negative electrode mixture layer includes 15 mass % or more of the graphite particles relative to a total mass of the negative electrode active material.

* * * * *